(12) United States Patent
Hayasaka

(10) Patent No.: US 6,320,961 B1
(45) Date of Patent: Nov. 20, 2001

(54) HINGE MECHANISM FOR A FOLDABLE PORTABLE TELEPHONE

(75) Inventor: Shigeki Hayasaka, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/443,890

(22) Filed: Nov. 19, 1999

(30) Foreign Application Priority Data

Nov. 20, 1998 (JP) .................................. 10-331712

(51) Int. Cl.[7] .................................................. H04M 1/00
(52) U.S. Cl. ............................................... 379/433.13
(58) Field of Search ............................. 379/433; 455/90, 455/575; 439/31, 86; 16/275, 276

(56) References Cited

U.S. PATENT DOCUMENTS 5,927,997 * 7/1999 Ruland et al. ........................ 439/31

FOREIGN PATENT DOCUMENTS

| 0611108 | 8/1994 | (EP). |
| 0356502 | 9/1989 | (GB). |
| 2215393 | 9/1989 | (GB). |
| 2263305 | 7/1993 | (GB). |
| 8-218721 | 8/1996 | (JP). |
| 2525942 | 11/1996 | (JP). |
| 1105727 | 2/1999 | (JP). |

* cited by examiner

*Primary Examiner*—Jack Chiang
(74) *Attorney, Agent, or Firm*—Sughrue, Mion, Zinn, Macpeak & Seas, PLLC

(57) ABSTRACT

A hinge mechanism for a foldable portable telephone is disclosed. The hinge includes a first cylindrical member coupled to a main body portion and a second cylindrical member coupled to a foldable portion. The first cylindrical member has a first cylindrical hollow formed therein and the inner side wall of the first cylindrical hollow has positioning recesses formed in a predetermined pattern corresponding to the opened and closed positions. The second cylindrical member has a second cylindrical hollow formed therein and a plurality of holes formed in a side wall thereof. The second cylindrical member is rotatably fit in the first cylindrical hollow of the first cylindrical member. An elastic cylinder is fit in the second cylindrical hollow. A hard ball freely fit in each of the holes and the hard balls fit in the holes are pinched between the elastic cylinder and the inner side wall of the first cylindrical hollow to allow each sphere to be fit into a corresponding one of the positioning recesses.

11 Claims, 4 Drawing Sheets

- HEMISPHERICAL RECESS 29.1
- HARD BALL 26
- HEMISPHERICAL RECESS 29.2
- 22
- 24
- 25 ELASTIC CYLINDER
- 21

HINGE MECHANISM FOR A FOLDABLE PORTABLE TELEPHONE

BACKGROUND OF THE INVENTION

1. Field of the Invention

The present invention relates to portable communication equipment and, more particularly to a hinge mechanism for use in a portable communication apparatus such as a portable telephone.

2. Description of the Related Art

In general, a foldable portable telephone is composed of a main body and a foldable portion which is rotatably supported on a single shaft by a hinge mechanism to rotate it between open and closed positions. A rotation of the foldable portion is preferably restricted and held at a desired angle with respect to the main body to allow stable and easy operation. There have been known a large number of single mechanisms that restrict and maintain a rotation of the foldable portion. Further preferably, a force required rotating the foldable portion between opened and closed positions is kept constant.

Such a hinge mechanism can be achieved by combining an elastic part such as a leaf spring or a coil spring and a well-known positioning and holding means using the fit between a ball and a recess. For example, Japanese Utility Model Registration No. 2525942 discloses a hinge mechanism in which a protrusion biased by a coil spring is engaged in a recess to hold the foldable part in position. Japanese Patent Unexamined Publication No. 8-218721 discloses a hinge mechanism with a fixing function in which a protrusion of a slidable cam biased by a coil spring is engaged in a recess of a fixed cam to hold the foldable part in position.

Needless to say, in the field of portable telephones, a drastic reduction in size and weight is demanded more and more. Although miniaturization of a leaf spring or a coil spring is also needed, the miniaturization makes it more difficult to provide the leaf spring or coil spring with a spring constant as large as necessary. A spring made of metal blocks weight reduction. A complicated mechanism composed of a lot of parts blocks cost reduction.

SUMMARY OF THE INVENTION

An object of the present invention is to provide a hinge mechanism for a portable telephone with simplified structure allowing easy folding/unfolding and holding operation of a foldable portion.

According to the present invention, a hinge mechanism for a foldable portable telephone composed of a main housing and a foldable housing which is rotatably supported to the main housing by the hinge mechanism to rotate the foldable housing between an opened position and a closed position is comprised of: a first cylindrical member coupled to the main housing, the first cylindrical member having a first cylindrical hollow formed therein, and an inner side wall of the first cylindrical hollow having a plurality of positioning recesses formed in a predetermined pattern corresponding to at least the opened position; a second cylindrical member coupled to the foldable housing, the second cylindrical member having a second cylindrical hollow formed therein and a plurality of holes formed in a side wall thereof, wherein the second cylindrical member is rotatably fit in the first cylindrical hollow of the first cylindrical member; an elastic cylinder fit in the second cylindrical hollow of the second cylindrical member; and a sphere freely fit in each of the holes of the second cylindrical member, wherein spheres fit in the holes are pinched between the elastic cylinder and the inner side wall of the first cylindrical hollow of the first cylindrical member to allow each sphere to be fit into a corresponding one of the positioning recesses.

According to another aspect of the present invention, a hinge mechanism includes a pair of shaft units, each shaft comprising: a first cylindrical member engaged with the main housing, the first cylindrical member having a first cylindrical hollow formed therein, and an inner side wall of the first cylindrical hollow having a plurality of positioning recesses formed in a predetermined pattern corresponding to at least the opened position; a second cylindrical member engaged with the foldable housing, the second cylindrical member having a second cylindrical hollow formed therein and a plurality of holes formed in a side wall thereof, wherein the second cylindrical member is rotatably fit in the first cylindrical hollow of the first cylindrical member; an elastic cylinder fit in the second cylindrical hollow of the second cylindrical member; a sphere freely fit in each of the holes of the second cylindrical member, wherein spheres fit in the holes are pinched between the elastic cylinder and the inner side wall of the first cylindrical hollow of the first cylindrical member to allow each sphere to be fit into a corresponding one of the positioning recesses; and a stopper for stopping the shaft unit moving in an axial direction of the hinge mechanism.

The stopper may comprise a hook portion formed at an end of the second cylindrical member, wherein the hook portion is hooked to the first cylindrical member to stop movement of the first and second cylindrical members in the axial direction.

Preferably, the inner side wall of the first cylindrical hollow has a plurality of sets of positioning recesses formed thereon and the second cylindrical member has a plurality of sets of holes formed thereon, the sets of the positioning recesses corresponding to the sets of the holes, respectively.

As described above, the spheres are outwardly biased by the elastic cylinder fit in the second cylindrical hollow of the second cylindrical member. Therefore, the foldable housing can be opened with an appropriate resistance to rotate and then the spheres snap into the positioning recesses to cause the foldable housing to be securely and easily held in position.

Further, since the elastic cylinder is used to generate an outwardly biased force, a shaft unit can be assembled with a small number of parts, resulting in simplified structure and reduced cost. Further, the hinge can be easily assembled by inserting the shaft units thereto.

DETAILED DESCRIPTION OF THE PREFERRED EMBODIMENTS

There will now be described in detail the present invention with reference to the accompanying drawings.

Figure 1A:
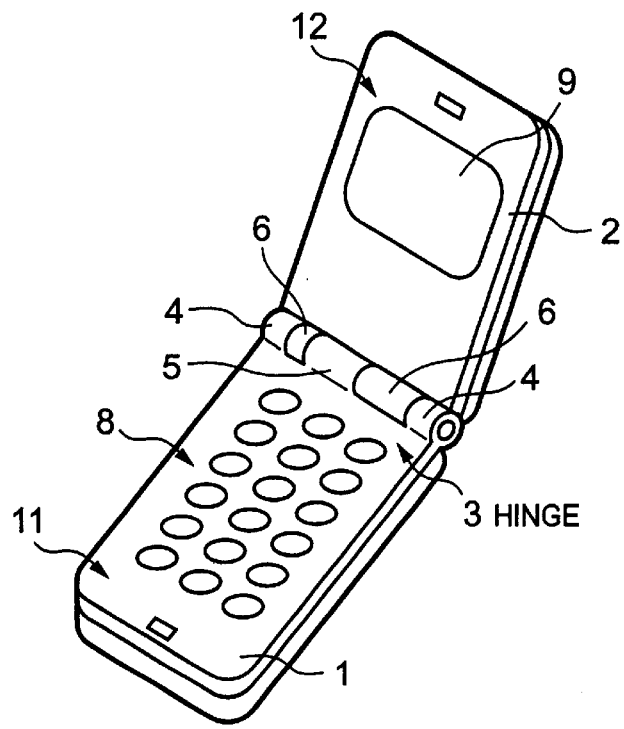
FIG. 1A is a perspective view illustrating a foldable portable telephone having a hinge mechanism according to a first embodiment of the present invention.
Figure 1B:
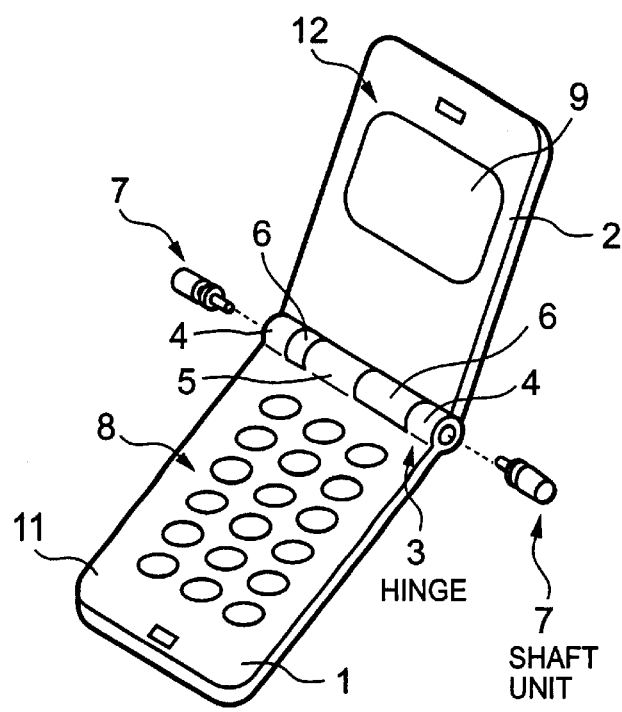
FIG. 1B is a perspective view illustration the foldable portable telephone in a state that a pair of shaft units is removed from the hinge according to the first embodiment.

Referring to FIGS. 1A and 1B, a foldable portable telephone is shown in the opened state. The foldable portable telephone is composed of a main body portion (or main housing) 1 and a foldable portion (or a folding housing) 2, which are rotatably connected by a hinge portion 3. Accordingly, the main body portion 1 and the foldable portion 2 are rotatable about the hinge portion 3 between opened and closed predetermined positions which form an appropriate angle as described later. The main body portion 1 has a pair of cylindrical portions 4 integrally formed at both ends of the hinge-side edge thereof and a cylindrical portion 5 integrally formed at the midsection of the hinge-side edge. The foldable portion 2 has two cylindrical portions 6 integrally formed at the hinge-side edge thereof. The hinge portion 3 is composed of the cylindrical portions 4–6 and a pair of shaft units 7. The respective shaft units 7 are inserted into both ends of the hinge portion 3 along the longitude direction thereof to allow the foldable portion 2 to be rotatably supported. The shaft units 7 are the same structure as described later.

Further, the main body portion 1 has a keypad sheet 8 and a microphone (not shown) on the inner surface 11 thereof. The foldable portion 2 has a display 9 and a speaker (not shown) on the inner surface 12 thereof. The respective inner surfaces 11 and 12 of the main body portion 1 and the foldable portion 2 are directed to the mouth and the ear of a user. Therefore, the foldable portion 2 can be held at an appropriate angle with respect to the main body portion 1 so as to be convenient to use.

Figure 2:
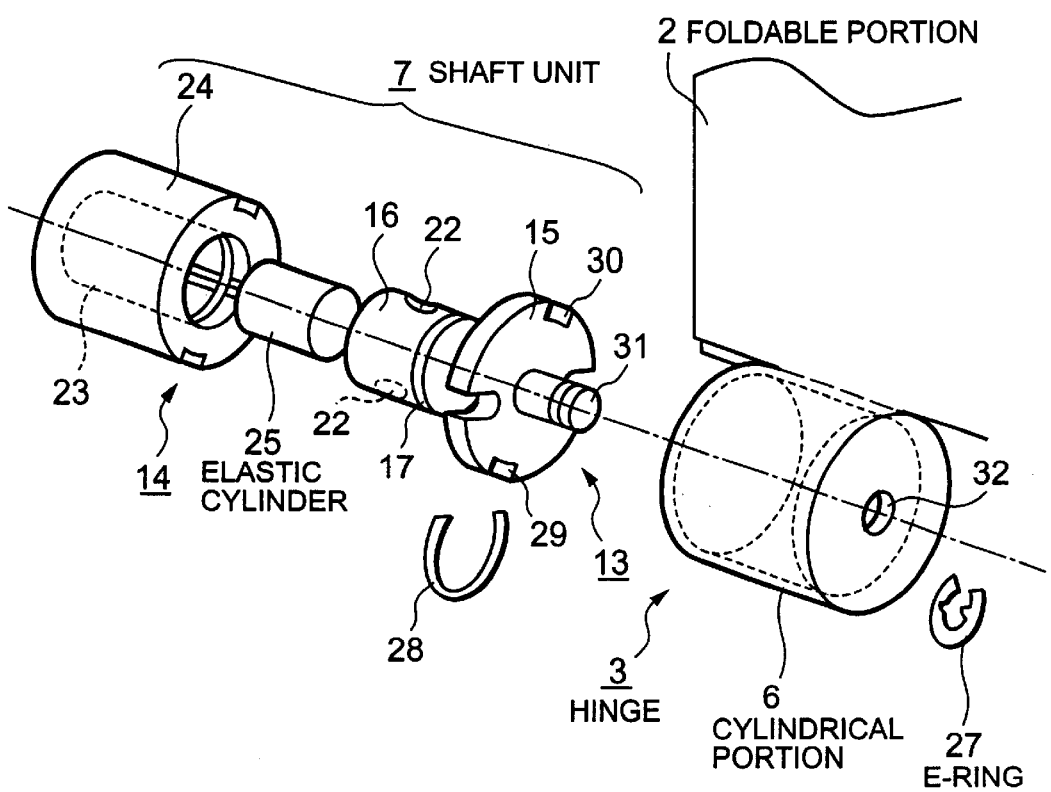
FIG. 2 is an exploded view illustrating a shaft unit of the hinge mechanism according to the first embodiment.
Figure 3:
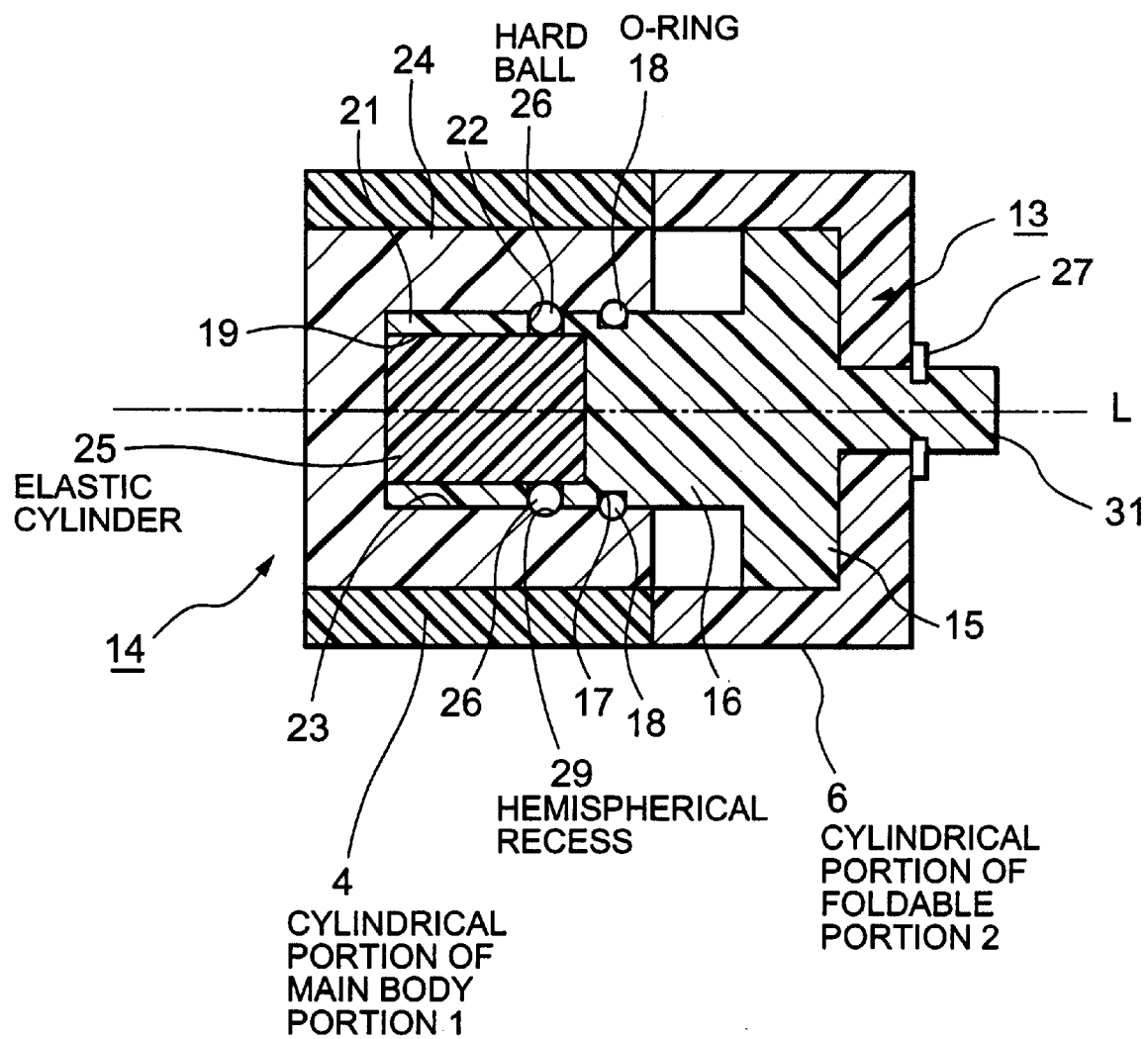
FIG. 3 is a sectional plan view illustrating the shaft unit of FIG. 2.

Referring to FIGS. 2 and 3, each of the shaft units 7 is composed of a first portion 13 and a second portion 14. The first portion 13 is composed of a large-diameter portion 15 and a small-diameter cylindrical portion 16, which are integrally formed about the same axis. The small-diameter cylindrical portion 16 has a groove 17 formed around the surface thereof. As shown in FIG. 3, and O ring 18 is fit into the groove 17. An end portion of the small-diameter cylindrical portion 16 has a cylinder 21 with a cylindrical hollow 19 formed therein. The cylinder 21 has two holes 22 formed 180 degrees apart through the side wall thereof. The second portion 14 is composed of a cylinder 24 with a cylindrical hollow 23 having a plurality ball-receiving hemispherical recesses and an O-ring groove formed on the inner surface of the hollow 23. The end portion of the small-diameter cylindrical portion 16 is rotatably fit into the hollow 23 such that the outer surface of the small-diameter cylindrical portion 16 is in contact with the inner surface of the hollow 23 with an appropriate force.

An elastic cylinder 25 is secured within the hollow 19 of the small-diameter cylindrical portion 16. In this case, the elastic cylinder 25 is compressed before inserted into the hollow 19 so as to generate an outwardly biased force in the hollow 19. The elastic cylinder 25 is made of synthetic material having rubber flexibility. For example, urethane rubber or other elastomer may be used. The elastic cylinder 25 is further preferably made of liquid urethane rubber, which is a kind of solid solution of rubber molecules and has a physical characteristic suitable for ball-less bearing. Such an elastic material improves both sliding and rolling characteristics of a ball.

As shown in FIG. 3, two hard balls or spheres 26 are freely fit in the respective holes 22 of the cylinder 21 with the elastic cylinder 25 secured in the hollow 19 thereof. Therefore, the hard balls 26 are sandwiched between the side wall of the elastic cylinder 25 and the inner surface of the hollow 23. The hard balls 26 are biased outwardly by the elastic cylinder 25 having rubber flexibility. The hemispherical recesses 29 are formed about 180 degrees apart on the inner surface of the hollow 23 so as to fit the hard balls therein, respectively. FIG. 3 shows the case where the respective hard balls 26 fit into the corresponding hemispherical recesses 29.

The first portion 13 is fit into the cylindrical portion 6 of the foldable portion 2. The shaft 31 is inserted into an opening 32 of the cylindrical portion 6 and is fixed by an E ring 27 to the cylindrical portion 6. The second portion 14 is fit into the cylindrical portion 4 of the main body portion 2. The second portion 14 is fixed by a stop ring 28 so as not to slip form the cylindrical portion 4.

The large-diameter portion 15 has a plurality of notches 30 formed in the periphery thereof as shown in FIG. 2. The cylindrical portion 6 has a plurality of protrusions (not shown) formed on the inner surface thereof, the respective protrusions corresponding to the notches 30. By inserting each protrusion into the corresponding notch 30, the first portion 13 rotates in synchronization with a rotation of the foldable portion 2.

Similarly the cylinder 24 of the second portion 14 has a plurality of notches formed at the same positions as the notches 30 in the periphery thereof as shown in FIG. 2. The cylindrical portion 4 has a plurality of protrusions (not shown) formed on the inner surface thereof, the respective protrusions corresponding to the notches of the cylinder 24. By inserting each protrusion into the corresponding notch, the second portion 14 is fixed to the main body portion 1.

In the case where the shaft unit 7 is assembled, the elastic cylinder 25 is compressed lightly and then is inserted into the hollow 19 of the first portion 13. Subsequently, the O ring 18 is fit into the groove 17 and the respective hard balls 26 are put in the holes 22. At this time, to prevent the hard balls 26 from dropping, the cylinder 21 of the first portion 13 is inserted into the hollow 23 of the second portion 14 to the extent that the groove for the O ring 18 formed on the inner surface of the cylinder 24 pinches the hard balls 26 put in the holes 22. Thereafter, the small-diameter cylindrical portion 16 of the first portion 13 is pushed into the hollow 23 of the second portion 14 as far as it will go while the hard ball 26 sinking inwardly. When the small-diameter cylindrical portion 16 is placed in position, as shown in FIG. 3, the respective hard balls 26 fit in hemispherical spaces formed by the holes 22 and the hemispherical recesses 29.

A sliding resistance, when the first portion 13 relatively rotating with respect to the second portion 14, is appropriately determined by the O ring 18. The elastic cylinder 25 is preferably made of soft material having rubber flexibility and high abrasion hardness. The hard balls 26 do not necessarily rotate but slightly slide or spin on the surface of the elastic cylinder 25 while rotating about the shaft 31 or the center line D. One pair of hemispherical recesses 29 which are 180 degrees apart forms a maximum angle of about 120 degress with respect to the other pair. Therefore, in the opened state that the respective hard balls 26 are placed in the hemispherical recesses 29, the foldable portion 2 is stably held forming a maximum angle of about 120 degrees with respect to the main body portion 1 as shown in FIGS. 1A and 1B. The other pair of hemispherical recesses 29 preferably corresponds to the closed position of the foldable portion 2.

When the foldable portion 2 is installed to the main body portion 1, the respective cylindrical portions 6 of the foldable portion 2 are inserted into a space between the one cylindrical portion 4 and the cylindrical portion 5 and another space between the other cylindrical portion 4 and the cylindrical portion 5 so that the cylindrical portions 4 of the main body portion 1 is aligned with the cylindrical portion 6 of the foldable portion 2 on the center line L. Thereafter, the assembled shaft units 7 are inserted into the cylindrical portions 4 of the main body portion 1 and the cylindrical portions 6 of the foldable portion 2. The E ring 27 and the stop ring 28 are used to stop the shaft units 7 moving in the longitudinal direction but freely rotating. In this way, an assembled hinge 3 is obtained as shown in FIG. 3.

Figure 4:
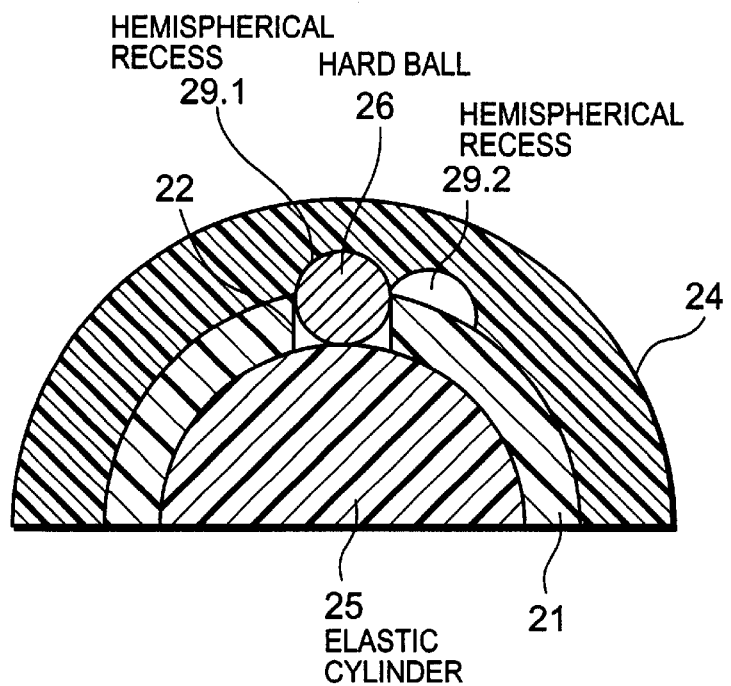
FIG. 4 is a sectional side view partly illustrating the shaft unit of FIG. 2.

Referring to FIG. 4, the cylinder 24 may have two hemispherical recesses 29.1 and 29.2 adjacent to each other formed on the inner surface thereof. Since a half of the cylinder 24 is shown in FIG. 4, the cylinder 24 actually has two pairs of hemispherical recesses. In the case where two hemispherical recesses 29.1 and 29.2 are adjacent to each other, a desired angle or position of the foldable portion 2 can be selected by the user.

Since the hard balls 26 are biased outwardly by the elastic cylinder 25, the respective hard balls 26 snap in the corresponding hemispherical recesses 29 to be held in position when the foldable portion 2 is opened about 120 degrees. Therefore, until the foldable portion 2 reaches the position, the user would feel a constant resistance in the foldable portion 2 to rotate due to the sliding resistance of the O ring 18 and the rotating resistance of the hard balls 26.

Figure 5:
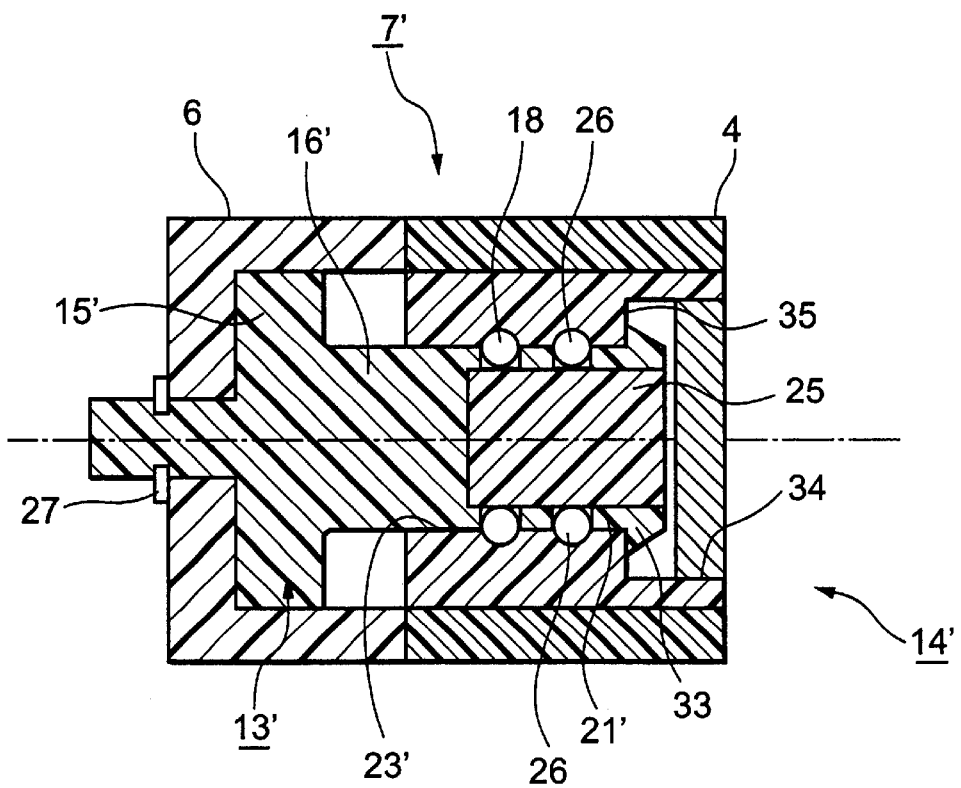
FIG. 5 is a sectional plan view illustration a shaft unit of a foldable portable telephone having a hinge mechanism according to a second embodiment of the present invention.

As shown in FIG. 5, a second embodiment of the present invention uses plural pairs of hard balls 26 to increase the locking force of the rotation mechanism. In the second embodiment, the shaft unit 7' is composed of a first portion 13' and a second portion 14'. The first portion 13' is composed of a large-diameter 15', and a small-diameter cylindrical portion 16', which are integrally formed about the same axis. An end portion of the small-diameter cylindrical portion 16' has a cylinder 21' with a hollow formed therein. The elastic cylinder 25 is inserted into the hollow of the cylinder 21' as the case of the first embodiment. The cylinder 21' has two or more pairs of holes each pair formed 180 degrees apart through the side wall thereof. The second portion 14' is composed of a cylinder with a hollow 23' having two sets of plural pairs of hemispherical recesses formed on the inner surface of the hollow 23'. The end portion of the small-diameter cylindrical portion 16' is rotatably fit into the hollow 23' such that the outer surface of the small-diameter cylindrical portion 16' is in contact with the inner surface of the hollow 23' with an appropriate force. Further, the small-diameter cylindrical portion 16' has a hook portion 33 formed at the end thereof. The second portion 14' has an opening 34 formed such that the inner diameter of the opening 34 is larger than that of the hollow 23' and therefore a step wall 35 is formed. The hook portion 33 is hooked on the step wall 35 to stop the shaft unit 7' moving in the longitudinal direction without the need of stop ring 28 used in the first embodiment. The large-diameter cylindrical portion 15' is preferably made of material such as elastic engineering plastics.

What is claimed is:

1. A hinge mechanism for a foldable portable telephone composed of a main housing and a foldable housing which is rotatably supported to the main housing by the hinge mechanism to rotate the foldable housing between an opened position and a closed position, comprising:

a first cylindrical member coupled to the main housing, the first cylindrical member having a first cylindrical hollow formed therein, and an inner side wall of the first cylindrical hollow having a plurality of positioning recesses formed in a predetermined pattern corresponding to at least the opened position;

a second cylindrical member coupled to the foldable housing, the second cylindrical member having a second cylindrical hollow formed therein and a plurality of holes formed in a side wall thereof, wherein the second cylindrical member is rotatably fit in the first cylindrical hollow of the first cylindrical member;

an elastic cylinder fit in the second cylindrical hollow of the second cylindrical member; and a sphere freely fit in each of the holes of the second cylindrical member, wherein spheres fit in the holes are pinched between the elastic cylinder and the inner side wall of the first cylindrical hollow of the first cylindrical member to allow each sphere to be fit into a corresponding one of the positioning recesses.

2. The hinge mechanism according to claim 1, wherein the positioning recesses are formed in a pattern corresponding to a plurality of opened positions.

3. The hinge mechanism according to claim 1, wherein the positioning recesses are formed in a pattern corresponding to the opened and closed positions.

4. The hinge mechanism according to claim 1, further comprising:

an O ring around a groove formed on the second cylindrical member, wherein the O ring is pinched between the groove and the inner side wall of the first cylindrical hollow of the first cylindrical member to generate a resistance to rotate the foldable housing.

5. The hinge mechanism according to claim 1, wherein the second cylindrical member comprises:

a large-diameter cylindrical member coupled to the foldable housing; and a small-diameter cylindrical member coaxially fixed to the large-diameter cylindrical member, the small-diameter cylindrical member having the second cylindrical hollow formed therein and the plurality of holes formed in a side wall thereof, wherein the small-diameter cylindrical member is rotatably fit in the first cylindrical hollow of the first cylindrical member.

6. The hinge mechanism according to claim 1, wherein the elastic cylinder is made of resin having rubber flexibility.

7. A hinge mechanism for a foldable portable telephone composed of a main housing and a foldable housing which is rotatably supported to the main housing by the hinge mechanism to rotate the foldable housing between an opened position and a closed position, comprising a pair of shaft units, each of the shaft units comprising:

a first cylindrical member engaged with the main housing, the first cylindrical member having a first cylindrical hollow formed therein, and an inner side wall of the first cylindrical hollow having a plurality of positioning recesses formed in a predetermined pattern corresponding to at least the opened position;

a second cylindrical member engaged with the foldable housing, the second cylindrical member having a second cylindrical hollow formed therein and a plurality of holes formed in a side wall thereof, wherein the second cylindrical member is rotatably fit in the first cylindrical hollow of the first cylindrical member;

an elastic cylinder fit in the second cylindrical hollow of the second cylindrical member;

a sphere freely fit in each of the holes of the second cylindrical member, wherein spheres fit in the holes are pinched between the elastic cylinder and the inner side wall of the first cylindrical hollow of the first cylindrical member to allow each sphere to be fit into a corresponding one of the positioning recesses; and a stopper for stopping the shaft unit moving in an axial direction of the hinge mechanism.

8. The hinge mechanism according to claim 7, wherein the stopper comprises a hook portion formed at an end of the second cylindrical member, wherein the hook portion is hooked to the first cylindrical member to stop movement of the first and second cylindrical member in the axial direction.

9. The hinge mechanism according to claim 7, wherein the inner side wall of the first cylindrical hollow has a plurality of sets of positioning recesses formed thereon and the second cylindrical member has a plurality of sets of holes formed thereon, the sets of the positioning recesses corresponding to the sets of the holes, respectively.

10. The hinge mechanism according to claim 7, wherein the first cylindrical member having a plurality of first notches formed around it, allowing engagement with the main housing, and the second cylindrical member having a plurality of second notches formed around it, allowing engagement with the foldable housing, wherein the first and second notches elongate in the axial direction to allow easy engagement.

11. The hinge mechanism according to claim 10, wherein the second cylindrical member comprises:

a large-diameter cylindrical member having the second notches formed around it to be engaged with the foldable housing; and a small-diameter cylindrical member coaxially fixed to the large-diameter cylindrical member, the small-diameter cylindrical member having the second cylindrical hollow formed therein and the plurality of holes formed in a side wall thereof, wherein the small-diameter cylindrical member is rotatably fit in the first cylindrical hollow of the first cylindrical member.

* * * * *